United States Patent
Yang

(10) Patent No.: US 12,021,783 B2
(45) Date of Patent: *Jun. 25, 2024

(54) INFORMATION TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 91 days.

This patent is subject to a terminal disclaimer.

(21) Appl. No.: 17/710,261

(22) Filed: Mar. 31, 2022

(65) Prior Publication Data

US 2022/0224489 A1 Jul. 14, 2022

Related U.S. Application Data

(63) Continuation of application No. 16/475,367, filed as application No. PCT/CN2017/070339 on Jan. 5, 2017, now Pat. No. 11,316,643.

(51) Int. Cl.
| | | |
|---|---|---|
| *H04L 1/00* | (2006.01) | |
| *H04L 5/00* | (2006.01) | |
| *H04W 72/044* | (2023.01) | |
| *H04W 72/23* | (2023.01) | |
| *H04W 72/53* | (2023.01) | |

(52) U.S. Cl.
CPC .......... *H04L 5/0053* (2013.01); *H04L 1/0039* (2013.01); *H04L 5/0005* (2013.01); *H04L 5/0087* (2013.01); *H04L 5/0091* (2013.01); *H04W 72/044* (2013.01); *H04W 72/23* (2023.01); *H04W 72/53* (2023.01)

(58) Field of Classification Search
CPC ... H04L 5/0053; H04L 1/0039; H04L 5/0005; H04L 5/0087; H04L 5/0091; H04W 72/044; H04W 72/23; H04W 72/53
See application file for complete search history.

(56) References Cited

U.S. PATENT DOCUMENTS

| | | | |
|---|---|---|---|
| 11,316,643 B2 * | 4/2022 | Yang | H04W 72/53 |
| 2013/0315190 A1 * | 11/2013 | Horiuchi | H04W 72/20 370/329 |

FOREIGN PATENT DOCUMENTS

| | | | | |
|---|---|---|---|---|
| EP | 3209050 A1 * | 8/2017 | ........... | H04L 5/0007 |
| KR | 20140145159 A | 12/2014 | | |

(Continued)

OTHER PUBLICATIONS

NOIP, Office Action for VN Application No. 1-2019-03881, dated Mar. 28, 2023.

(Continued)

*Primary Examiner* — Omar J Ghowrwal
(74) *Attorney, Agent, or Firm* — Hodgson Russ LLP

(57) ABSTRACT

The embodiments of the present disclosure provide a method for transmitting information, a terminal device and a network device. The method includes: the terminal device receiving first indication information sent by the network device; the terminal device receiving, according to the first indication information, first downlink control information sent by the network device.

20 Claims, 5 Drawing Sheets

(56) References Cited

FOREIGN PATENT DOCUMENTS

| | | |
|---|---|---|
| KR | 20170080678 A | 7/2017 |
| WO | 2012147601 A1 | 11/2012 |
| WO | 2012147638 A1 | 11/2012 |
| WO | 2012147639 A1 | 11/2012 |
| WO | 2012147640 A1 | 11/2012 |
| WO | WO-2016070424 A1 * 5/2016 ........... H04L 5/0007 |

OTHER PUBLICATIONS

JPO, Office Action for JP Application No. 2021-131749, dated Feb. 28, 2023.
EPO, Communication for EP Application No. 21176583.9, dated Mar. 29, 2023.
JPO, Second Office Action for Application No. 2021-131749, dated Oct. 19, 2022.
JPO, First Office Action for JP 2021131749, dated Jun. 17, 2022.
CNIPA, Second Office Action for CN202011059815.9, dated Jun. 30, 2022.
CNIPA, Second Office Action for CN202011059821.4, dated Jun. 30, 2022.
MYIPO, Office Action for MY Application No. PI2019003861, dated Aug. 11, 2023.
IPI, Office Action for IN Application No. 201917026820, dated Aug. 1, 2023.
NOIP, Office Action for VN Application No. 1-2019-03881, dated Aug. 30, 2023.
KIPO, Office Action for KR Application No. 10-2019-7019392, dated Sep. 26, 2023.
JPO, Office Action for JP Application No. 2021-131749, dated Jul. 11, 2023.

* cited by examiner

INFORMATION TRANSMISSION METHOD, TERMINAL DEVICE AND NETWORK DEVICE

CROSS-REFERENCE TO RELATED APPLICATIONS

The present application is a continuation of U.S. patent application Ser. No. 16/475,367, filed Jul. 1, 2019, which is a U.S. National Stage Entry of International Application No. PCT/CN2017/070339, filed Jan. 5, 2017, the entire disclosures of which are incorporated herein by reference.

TECHNICAL FIELD

Embodiments of the present disclosure relates to the technical field of communication, and in particular, to a method for transmitting information, a terminal device and a network device.

BACKGROUND

In an existing wireless communication system, such as a Long Term Evolution (LTE) system, time-frequency resources taken by downlink control information in a single scheduling unit are fixed. Taking a sub-frame as a scheduling unit for example, the first few symbols in each sub-frame are used to transmit the downlink control information, and the downlink control information spans the entire system bandwidth in the frequency domain.

Future wireless communication systems, such as 5G, are committed to supporting higher system performance and need to support multiple service types, different deployment scenarios, and a wider spectrum range.

SUMMARY

The embodiments of the present disclosure provide a method for transmitting information, a terminal device, and a network device.

In a first aspect, a method for transmitting information is provided, including: receiving, by a terminal device, first indication information sent by a network device; and receiving, by the terminal device, first downlink control information sent by the network device, according to the first indication information.

In a possible implementation of the first aspect, receiving, by the terminal device, first downlink control information sent by the network device, according to the first indication information includes: determining, by the terminal device, a first resource area for transmitting downlink control information according to the first indication information; and receiving, by the terminal device, first downlink control information by detecting the first downlink control information sent by the network device on the first resource area.

In a possible implementation of the first aspect, the first indication information is used to indicate the first resource area.

In a possible implementation of the first aspect, determining, by the terminal device, a first resource area for transmitting downlink control information according to the first indication information includes: determining, by the terminal device, a first transmission mode from a plurality of transmission modes according to the first indication information, wherein a resource area corresponding to each of the plurality of transmission modes is different; and determining, by the terminal device, the resource area corresponding to the first transmission mode as the first resource area.

In a possible implementation of the first aspect, the first indication information is used to indicate the first transmission mode.

In a possible implementation of the first aspect, starting resource areas corresponding to respective transmission modes are different; the first indication information is used to indicate a starting resource area in the first resource area; and determining, by the terminal device, a first transmission mode from a plurality of transmission modes according to the first indication information includes: determining, by the terminal device, a first transmission mode from a plurality of transmission modes, which corresponds to the starting resource area in the first resource area, according to the first indication information.

In a possible implementation of the first aspect, starting resource areas corresponding to respective transmission modes are different, and the first indication information is used to indicate that the first resource area for transmitting downlink control information has changed; and determining, by the terminal device, a first transmission mode from a plurality of transmission modes according to the first indication information includes: determining, by the terminal device, an initial resource area in the first resource area by detecting downlink control information on all or part of a second resource area for transmitting downlink control information configured previously or in configuration information; and determining, by the terminal device, a first transmission mode corresponding to the initial resource area from the plurality of transmission modes according to the initial resource area in the first resource area.

In a possible implementation of the first aspect, the plurality of transmission modes are previously configured, or the plurality of transmission modes are configured through configuration information.

The multiple modes can be previously configured, or configured through configuration information, so the flexibility of the solution is high.

In a possible implementation of the first aspect, receiving, by the terminal device, first downlink control information by detecting the first downlink control information sent by the network device on the resource area includes: after the terminal device receives the first indication information, and before the terminal device receives second indication information, receiving, by the terminal device, the first downlink control information by detecting the first downlink control information on the first resource area in each scheduling unit of at least one scheduling unit; wherein the second indication information is used to indicate that the first resource area has changed or the second indication information is used to indicate a change result of the first resource area.

After the terminal device determines the first resource area, the terminal device can receive the first downlink control information by detecting the first downlink control information on each scheduling unit of the at least one scheduling unit. The terminal device does not need to frequently determine the first resource area repeatedly, which can improve system performance.

In a possible implementation of the first aspect, the first indication information is used to indicate that a first resource area for transmitting downlink control information has changed; and receiving, by the terminal device, first downlink control information sent by the network device, according to the first indication information, includes: receiving, by the terminal device, the first downlink control information by detecting the first downlink control information on all or part of second resource area for transmitting downlink control information configured previously or in configuration information, according to the first indication information.

In a possible implementation of the first aspect, the method further includes: determining, by the terminal device, a first resource area for transmitting downlink control information by detecting downlink control information on all or part of the second resource area.

In a possible implementation of the first aspect, determining, by the terminal device, a first resource area for transmitting downlink control information by detecting downlink control information on all or part of the second resource area includes: determining, by the terminal device, the first resource area by detecting downlink control information on all or part of the second resource area in an initial scheduling unit after the terminal device receives the first indication information.

In a possible implementation of the first aspect, receiving, by the terminal device, the first downlink control information by detecting the first downlink control information on all or part of second resource area for transmitting downlink control information configured previously or in configuration information, according to the first indication information, includes: after the terminal device determines the first resource area, and before the terminal device receives the second indication information, receiving, by the terminal device, the first downlink control information by detecting the first downlink control information on the first resource area in each scheduling unit of at least one scheduling unit; wherein the second indication information is used to indicate that the first resource area has changed or the second indication information is used to indicate a change result of the first resource area.

In a possible implementation of the first aspect, a frequency domain resource included in the resource area is part of a system bandwidth.

In a possible implementation of the first aspect, the method further includes: receiving, by the terminal device, first configuration information and/or second configuration information sent by the network device; wherein the first configuration information is used to configure a plurality of transmission modes for transmitting downlink control information, and the second configuration information is used to configure a second resource area for transmitting downlink control information.

In this implementation, the second resource area and/or the plurality of transmission modes for transmitting downlink control information are configured through configuration information, which is highly flexible.

Optionally, in a possible implementation of the first aspect, the method further includes that the first indication information is used to indicate an initial resource area of the first resource area, and if the terminal device determines that the initial resource area of the first resource area is not used for transmission of downlink control information by detecting the initial resource area of the first resource area, the terminal device can determine that the scheduling unit does not perform downlink control information transmission.

In a second aspect, there is provided a method for transmitting information, including: sending, by a network device, first indication information according to a first resource area for transmitting downlink control information, wherein the first indication information is used by a terminal device to receive first downlink control information sent by the network device; and sending, by a network device, downlink control information on the first resource area for transmitting downlink control information.

In a possible implementation of the second aspect, sending, by a network device, first indication information to the terminal device according to a first resource area for transmitting downlink control information includes: when the network device determines that the first resource area has changed according to the first resource area for transmitting downlink control information, sending, by the network device, first indication information, wherein the first resource area for transmitting downlink control information is the resulted first resource area after the change.

In a possible implementation of the second aspect, the first indication information is used to indicate that the first resource area has changed; and/or the first indication information is used to indicate a change result of the first resource area.

In a possible implementation of the second aspect, the first indication information is used by the terminal device to determine the first resource area for transmitting downlink control information, so that the terminal device receives the first downlink control information by detecting the first downlink control information on the first resource area for transmitting downlink control information.

In a possible implementation of the second aspect, the first indication information is used to indicate the first resource area for transmitting downlink control information.

In a possible implementation of the second aspect, the first indication information is used to indicate a first transmission mode, so that the terminal device determines, according to the first indication information, a resource area corresponding to a first transmission mode determined from a plurality of transmission modes as the first resource area for transmitting downlink control information, wherein a resource area corresponding to each of the plurality of transmission modes is different.

In a possible implementation of the second aspect, the first indication information is used to indicate an initial resource area for transmitting downlink control information, so that the terminal device determines, according to the first indication information, a resource area corresponding to a first transmission mode determined from a plurality of transmission modes as the first resource area for transmitting downlink control information, wherein an initial resource area corresponding to each of the plurality of transmission modes is different.

In a possible implementation of the second aspect, the first indication information is used to indicate that the first resource area has changed.

In a possible implementation of the second aspect, the method further includes: sending, by the network device, first configuration information and/or second configuration information; wherein the first configuration information is used to configure a plurality of transmission modes for transmitting downlink control information, and the second configuration information is used to configure a second resource area for transmitting downlink control information.

Optionally, in or a possible implementation of the first aspect or the second aspect, the first configuration information and/or the second configuration information may be carried in system information, or in dedicated control signaling (or channel).

Optionally, in or a possible implementation of the first aspect or the second aspect, the first indication information may be carried in the radio resource control RRC layer signaling, the medium access control MAC layer signaling, or the physical layer signaling.

In a possible implementation of the second aspect, the first indication information is used to indicate at least one of a first resource area for transmitting downlink control information, a location of a frequency domain resource included in the first resource area for transmitting downlink control information, a starting location of the frequency domain resource included in the first resource area for transmitting downlink control information, a granularity of the frequency domain resource included in the first resource area for transmitting downlink control information, a location of a time domain resource included in the first resource area for transmitting downlink control information, a starting location of the time domain resource included in the first resource area for transmitting downlink control information, a granularity of the time domain resource included in the first resource area for transmitting downlink control information, and a transmission mode corresponding to the downlink control information, wherein the transmission mode corresponding to the downlink control information corresponds to the first resource area for transmitting downlink control information.

In this implementation, the first indication information can be used to indicate various types of information, and the flexibility of the solution is high, which is beneficial for the terminal device to determine the first downlink control information according to the first indication information.

In a third aspect, a terminal device is provided for performing the method of any of the above first aspect or any of the possible implementations of the first aspect. In particular, the network device includes means for performing the method of any of the first aspect or any of the possible implementations of the first aspect.

In a fourth aspect, a network device is provided for performing the method of any of the second aspect or any of the possible implementations of the second aspect. In particular, the terminal device includes means for performing the method of any of the second or any of the possible implementations of the second aspect.

In a fifth aspect, a terminal device is provided, the terminal device including: a memory and a processor. The memory is configured to store instructions, the processor is configured to execute the instructions stored by the memory, and when the processor executes the instruction stored by the memory, the processor is caused to perform the method of the first aspect or any of the possible implementations of the first aspect.

In a sixth aspect, a network device is provided, the network device including: a memory and a processor. The memory is configured to store instructions, the processor is configured to execute the instructions stored by the memory, and when the processor executes the instruction stored by the memory, the processor is caused to perform the method of the second aspect or any of the possible implementations of the second aspect.

In a seventh aspect, there is provided a computer readable medium for storing a computer program, the computer program including instructions for performing the method of the first aspect or any of the possible implementations of the first aspect.

In an eighth aspect, there is provided a computer readable medium for storing a computer program, the computer program including instructions for performing the method of the second aspect or any of the possible implementations of the second aspect.

DETAILED DESCRIPTION

The technical solutions in the embodiments of the present disclosure will be clearly and completely described in the following with reference to the accompanying drawings.

The technical solution of the embodiments of the present disclosure can be applied to various communication systems, for example, a Global System of Mobile communication ("GSM") system, a Code Division Multiple Access ("CDMA") system, a Wideband Code Division Multiple Access ("WCDMA") system, General Packet Radio Service ("GPRS"), a Long Term Evolution ("LTE") system, LTE Frequency Division Duplex ("FDD") system, LTE Time Division Duplex ("TDD"), a Universal Mobile Telecommunication System ("UMTS"), a worldwide interoperability for microwave access communication system, a future evolution of the Public Land Mobile Network (PLMN), or a future 5G system.

Figure 1:
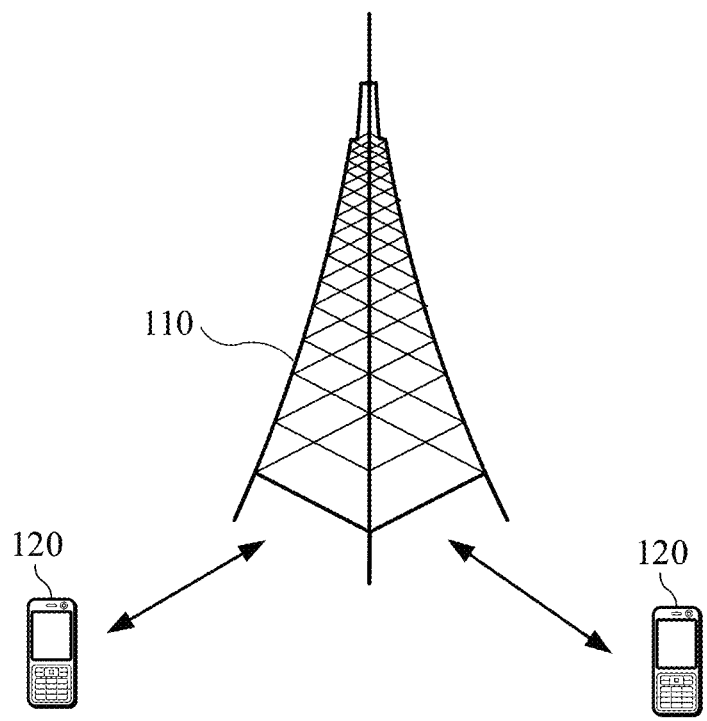
FIG. 1 is a schematic diagram of a wireless communication system applicable in the embodiments of the present disclosure.

FIG. 1 is a schematic diagram of a wireless communication system applicable in the embodiments of the present disclosure. The wireless communication system 100 can include at least one network device 110. The network device 100 can be a device in communication with a terminal device. Each network device 100 can provide communication coverage for a particular geographic region and can communicate with terminal devices (e.g., UEs) located within the coverage area. The network device 100 can be a base station (Base Transceiver Station, BTS) in a GSM system or a CDMA system, or can be a base station (NodeB, NB) in a WCDMA system, or can be an evolved base station in an LTE system (Evolutional Node B, eNB or eNodeB), or a wireless controller in a Cloud Radio Access Network (CRAN), or the network device can be a relay station, an access point, an in-vehicle device, a wearable device, or a network side device in a future 5G network or a network device in a future evolved PLMN.

The wireless communication system 100 also includes a plurality of terminal devices 120 located within the coverage of the network device 110. The terminal device 120 can be mobile or fixed. The terminal device 120 can refer to an access terminal, user equipment (User Equipment, UE), a subscriber unit, a subscriber station, a mobile station, a mobile platform, a remote station, a remote terminal, a mobile device, a user terminal, a terminal, a wireless communication device, and a user agent or a user device. The access terminal can be a cellular phone, a cordless phone, a Session Initiation Protocol (SIP) phone, a Wireless Local Loop (WLL) station, a Personal Digital Assistant (PDA), a handheld device with wireless communication function, a computing device or other processing device connected to wireless modems, an in-vehicle device, a wearable device, a terminal device in a future 5G network, or a terminal device in a future evolved PLMN, and the like.

Optionally, the wireless communication system 100 can further include other network entities, such as a network controller, a mobility management entity, and the like, and the embodiment of the present disclosure is not limited thereto.

Figure 2:
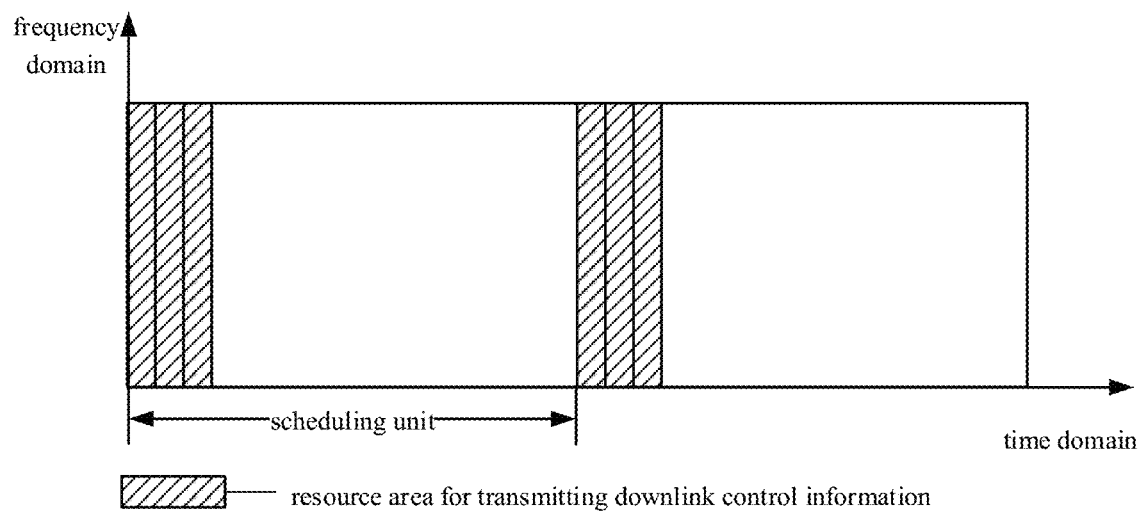
FIG. 2 is a schematic diagram of a resource area of a conventional sub-frame.

FIG. 2 is a schematic diagram of a resource area of a conventional sub-frame. As shown in FIG. 2, in the prior art, the resource area for transmitting downlink control information is fixed. The terminal device can detect its own first downlink control information at a fixed location. This method has low flexibility and is not conducive to improving system performance.

For example, a conventional system has a bandwidth of 20 MHz, and the terminal device detects the first downlink control information in the entire system bandwidth of the first three symbols of the sub-frame. In future wireless communication systems (e.g., 5G), the bandwidth of the system can be extended to 80 MHz, 160 MHz or even 320 MHz. If the network device still sends downlink control information according to the full bandwidth, it will cause a large waste of resources. In addition, transmitting downlink control information on a fixed resource area can also cause unnecessary interference of control information between cells.

In view of the above, an embodiment of the present disclosure provides a method for transmitting information, in which the first resource area for transmitting downlink control information is not fixed, and the network device can determine different first resource areas, and the method has a higher flexibility and applicability, which is conducive to improve system performance.

Hereinafter, a method for transmitting information according to an embodiment of the present disclosure will be described in detail with reference to FIG. 3.

Figure 3:
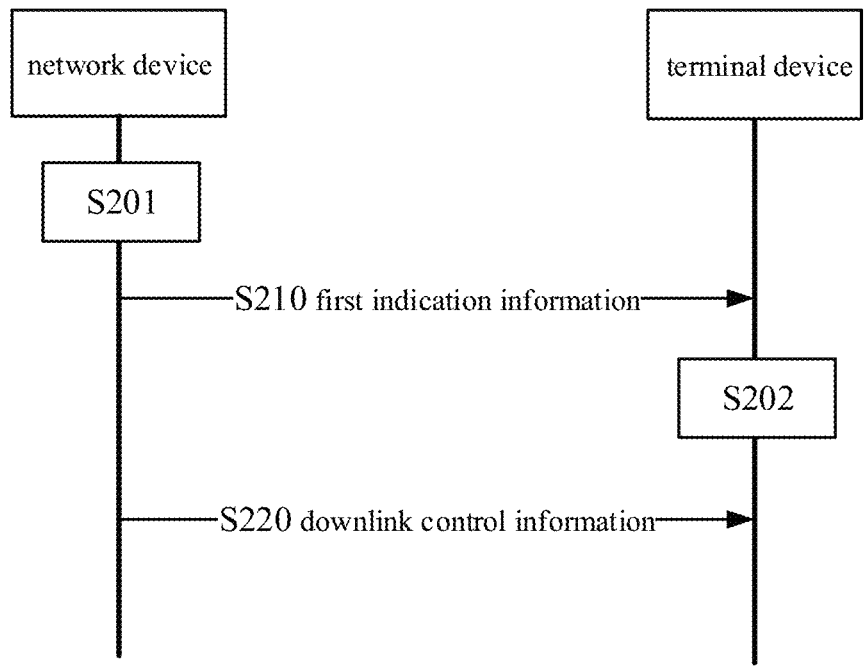
FIG. 3 is a schematic flowchart of a method for transmitting information according to an embodiment of the present disclosure.

It should be understood that FIG. 3 illustrates the detailed communication steps or operations of the method, but these steps or operations are merely examples, and other embodiments of the present application can also perform other operations or variations of the various operations in FIG. 3. Moreover, the various steps in FIG. 3 can be performed in a different order than that shown in FIG. 3, and it is possible to perform only a part of the operations in FIG. 3.

FIG. 3 is a schematic flowchart of a method for transmitting information according to an embodiment of the present disclosure. The method 200 can be applied to the wireless communication system 100 as described in FIG. 1, but the embodiment of the present disclosure is not limited thereto. As shown in FIG. 3, the method 200 includes the following steps.

In S210, the network device sends first indication information to the terminal device according to a first resource area for transmitting downlink control information; correspondingly, and the terminal device receives the first indication information sent by the network device.

It should be understood that the first resource area can be understood as a resource area taken by the network device when transmitting downlink control information. The network device will use the first resource area to transmit downlink control information.

The number of the first resource areas can be one or more. For example, the first resource area can include a first resource area $P_1$ and a first resource area $P_2$, The frequency domain resources included in the first resource area can take the entire system bandwidth or can take a part of the system bandwidth. For example, assuming that the system bandwidth is 80 MHz, the frequency domain resources included in the first resource area $P_1$ can be 0-20 MHz.

Optionally, the frequency domain resources in the first resource area can be continuous or discontinuous. For example, assuming that the number of the first resource areas is two, the system bandwidth is 80 MHz, the frequency domain resource in the first resource area $P_{target1}$ is 0-20 MHz, and the frequency domain resource in the first resource area $P_{target2}$ is 30-50 MHz. That is, the first resource area includes frequency domain resources of 0-20 MHz and 30-50 MHz.

Optionally, the time domain resources included in the first resource area can be continuous or discontinuous. For example, assuming that the number of the first resource areas is two, the time domain resource in the first resource area $P_{target1}$ can be a symbol numbered 0. The time domain resource in the first resource area Ptarget2 can be a symbol numbered 2. That is, the time domain resource included in the first resource area are symbols numbered 0 and 2.

The first indication information is used by the terminal device to receive the first downlink control information sent by the network device. The first indication information can be carried in system information or dedicated control signaling (or channel). For example, the first indication information can be carried in Radio Resource Control (RRC) layer signaling, Medium Access Control (MAC) layer signaling, or physical layer signaling.

It should be noted that the related description of the time-frequency resource of the first resource area is applicable to the resource area of the embodiments of the present disclosure. For example, a second resource area or a resource area corresponding to the transmission mode (described later) includes a frequency domain resource that may be part of the system bandwidth.

In S220, the network device sends downlink control information on the first resource area for transmitting downlink control information. Correspondingly, the terminal device receives, according to the first indication information, the first downlink control information sent by the network device.

It should be understood that the first downlink control information is downlink control information for the terminal device. The first indication information can be directed to a certain terminal device, and the first indication information can also be directed to a plurality of terminal devices.

Optionally, the method can further include the following.

In a possible solution, the first indication information can be directed to a certain terminal device. For example, the first indication information can be directed to a terminal device $UE_1$, and the first indication information can be used to indicate a resource area (for example, the number of the sub-frame, the number of the symbol, and the location of the frequency domain resource) taken by downlink control information $I_1$ (downlink control information $I_1$ is downlink control information for the terminal device $UE_1$). The terminal device $UE_1$ can determine the time-frequency resource where the downlink control information $I_1$ is located after receiving the first indication information.

In another possible solution, the first indication information can be directed to a plurality of terminal devices (optionally, the plurality of terminal devices can be all terminal devices covered by the network device). For example, the first indication information can be used to indicate the first resource area. Each terminal device of the plurality of terminal devices can detect downlink control information belonging to itself on the first resource area according to the first indication information. For example, the terminal device $UE_1$ can detect the downlink control information $I_1$ on the first resource area according to the first indication information, and a terminal device $UE_2$ can detect downlink control information $I_2$ on the first resource area according to the first indication information.

It should be noted that, if the first indication information is directed to a plurality of terminal devices, the first resource area is a time-frequency resource in one scheduling unit. The scheduling unit can refer to a time domain resource unit for one data transmission of the terminal device scheduled by the network device. For example, one scheduling unit can correspond to one or more sub-frames, slots, or mini-slots and the like in the time domain.

For example, if the scheduling unit is a sub-frame, the time domain resources included in the first resource area are symbols numbered 0, 1, and 2, and the frequency domain resource is 0-20 MHz. The network device can send downlink control information on the first resource area of each scheduling unit of the at least one scheduling unit. For example, the network device sends downlink control information on the first resource area of the sub-frame numbered 1, and downlink control information on the first resource area of the sub-frame numbered 2.

The first resource area in the embodiment of the present disclosure is not fixed, and the network device can determine different first resource areas according to actual conditions. Therefore, the network device sends the first indication information to the terminal device before sending the downlink control information on the first resource area. The terminal device first receives the first indication information, and then receives the first downlink control information sent by the network device according to the first indication information.

Therefore, the first resource area of the embodiment of the present disclosure has high flexibility compared to the prior art in which resource area for transmitting downlink control information is fixed and unchanged. The network device can determine different first resource areas according to actual conditions. The frequency domain resources (broadband) and time domain resources (symbols) included in the first resource area can be flexibly determined according to actual conditions. After determining the first resource area, the network device can send the first indication information and then send the downlink control information, so that the terminal device can receive the first downlink control information according to the first indication information. The method of the embodiment of the present disclosure can better adapt to satisfy the requirement of flexibly configuring the first resource for transmitting downlink control information in a large-bandwidth system, and can improve system efficiency and reduce system interference.

Optionally, the network device can send the first indication information according to the first resource area in various situations.

For example, the network device can, based on a timer timing, periodically send the first indication information to the terminal device according to the first resource area for transmitting the downlink control information.

For another example, when the first resource area changes, the network device sends the first indication information according to the resulted first resource area after the change.

Optionally, the method S200 can include the following steps.

In S201, the network device can determine a first resource area for transmitting downlink control information.

Specifically, if the first resource area currently determined by the network device is different from the first resource area for transmitting the downlink control information previously, the network device determines that the first resource area has changed. In this case, the first indication information can be used to indicate that the first resource area has changed, and can also be used to indicate a change result of the first resource area.

It should be noted that, in the embodiment of the present disclosure, the first resource area for transmitting downlink control information refers to the resulted first resource area after the change. In other words, if the first resource area changes, the network device sends downlink control information on the resulted first resource area after the change.

Hereinafter, the embodiment of the present disclosure will be described by taking a change in the first resource as an example. Unless otherwise specified, the first resource area described below is the resulted first resource area after the change.

The first indication information in the embodiment of the present disclosure is described in detail by taking the first indication information as an example for a plurality of terminal devices. Optionally, the first indication information can include the following situations.

(I) The first indication information is used by the terminal device to determine the first resource area.

That is, optionally, the method 200 can include the following.

In S201, the terminal device determines the first resource area according to the first indication information. Optionally, the first indication information can include the following:

(1) The first indication information is used to indicate the first resource area.

Specifically, after receiving the first indication information, the terminal device can directly learn about the first resource area.

Figure 4:
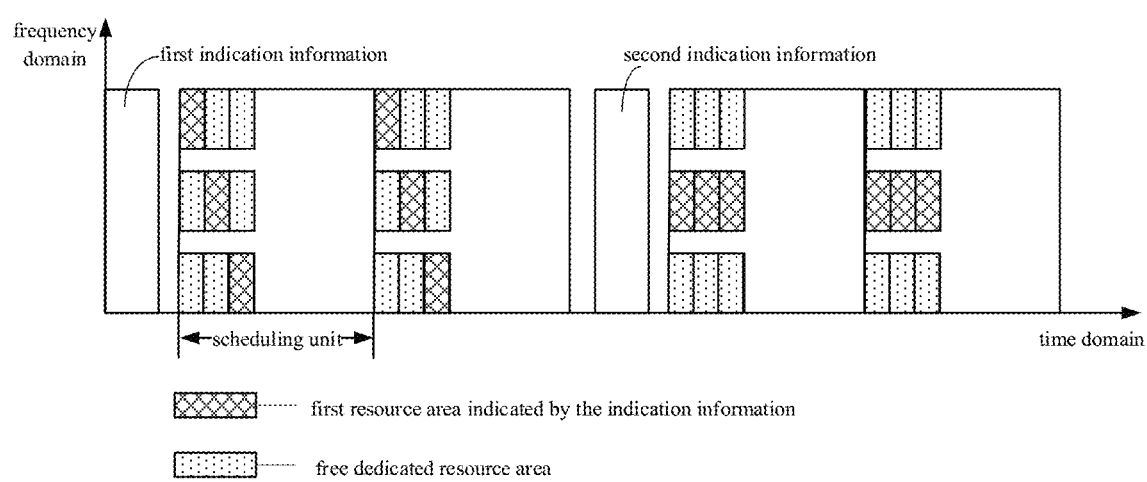
FIG. 4 is a schematic diagram of an example of a method for transmitting information according to an embodiment of the present disclosure.

FIG. 4 is a schematic diagram of an example of a method for transmitting information according to an embodiment of the present disclosure. As shown in FIG. 4, it is assumed that the number of the first resource areas is three, and the first resource area includes a first resource area $P_{target1}$, a first resource area $P_{target2}$, and a first resource area $P_{target3}$. The first indication information can be used to indicate the first resource area $P_{target1}$, the first resource area $P_{target2}$, and the first resource area $P_{target3}$.

(2) The first indication information is used by the terminal device to determine a first transmission mode from a plurality of transmission modes, wherein the resource area corresponds to the first transmission mode is the first resource area.

The plurality of transmission modes can be previously agreed between the network device and the terminal device, or can be previously configured, or can be configured by the network device with configuration information. Each of the plurality of transmission modes corresponds to a different resource area. Optionally, the network device can send, to the terminal device, first configuration information, wherein the first configuration information is used to configure the multiple transmission modes.

For example, the plurality of transmission modes includes a transmission mode $T_1$, a transmission mode $T_2$, and a transmission mode $T_3$. The resource area corresponding to the transmission mode $T_1$ includes symbols numbered 0, 1, and 2 on the time domain resource, and includes a bandwidth of 55-75 MHz on the frequency domain resource (corresponding to the symbol numbered 0), a bandwidth of 30-50 MHz on the frequency domain resource (corresponding to the symbol numbered 1), and a bandwidth of 5-25 MHz on the frequency domain resource (corresponding to the symbol numbered 2). The resource area corresponding to the transmission mode $T_2$ includes symbols numbered 0, 1, and 2 on the time domain resource, and includes a bandwidth of 30-50 MHz on the frequency domain resource. The resource area corresponding to the transmission mode $T_3$ includes symbols numbered 0, 1, and 2 on the time domain resource, and includes a bandwidth of 5-25 MHz on the frequency domain resource.

Specifically, the terminal device can determine the first transmission mode from the plurality of transmission modes according to the first indication information, and determine the resource area corresponding to the first transmission mode as the first resource area. The first indication information can include at least the following.

(2a) The first indication information is used to indicate the first transmission mode.

Specifically, after receiving the first indication information, the terminal device can directly learn about the first transmission mode, and determine the resource area corresponding to the first transmission mode as the first resource area. The first indication information can be used to indicate the sequence number of the first transmission mode.

Still referring to the example described above in which the plurality of transmission modes includes the transmission mode $T_1$, the transmission mode $T_2$, and the transmission mode $T_3$, the first indication information can be used to indicate the transmission mode $T_1$, and the terminal device determines the transmission mode $T_1$ from the plurality of transmission modes after receiving the first indication information, that is, the transmission mode $T_1$ is the first transmission mode.

For example, the first indication information can be used to indicate the sequence number of the first transmission mode.

(2b) The first indication information is used to indicate an initial resource area of the first resource area for transmitting downlink control information. The initial resource area for each of the plurality of transmission modes is different. That is, the initial resource areas corresponding to different transmission modes are different.

Still referring to the example described above in which the plurality of transmission modes includes the transmission mode $T_1$, the transmission mode $T_2$, and the transmission mode $T_3$, the time domain resource included in the initial resource area corresponding to the transmission mode $T_1$ is a symbol numbered 0, and the frequency domain resource is a bandwidth of 55-75 MHz; the time domain resource included in the initial resource area corresponding to the transmission mode $T_2$ is a symbol numbered 0, and the frequency domain resource is a bandwidth of 30-50 MHz; and the time domain resource included in the initial resource area corresponding to the transmission mode $T_3$ is a symbol numbered 0, and the frequency domain resource is a bandwidth of 5-25 MHz. Assuming that the time domain resource included in the initial resource area of the first resource area indicated by the first indication information is a symbol numbered 0, and the frequency domain resource is a bandwidth of 55-75 MHz, the terminal device can determine, according to the first indication information, a transmission mode $T_1$ from the plurality of transmission modes.

Optionally, the initial resource area corresponding to the transmission mode can be specified according to the time domain resource and/or the frequency domain resource. For example, it can be agreed that the resource area where the first symbol is located is the initial resource area.

Optionally, if the first indication information is used to indicate an initial resource area of the first resource area, and the terminal device determines that the initial resource area of the first resource area is not used for transmission of downlink control information by detecting the initial resource area of the first resource area, the terminal device can determine that the scheduling unit does not perform downlink control information transmission. The terminal device can continue to detect the first downlink control information on the subsequent scheduling unit.

Figure 5:
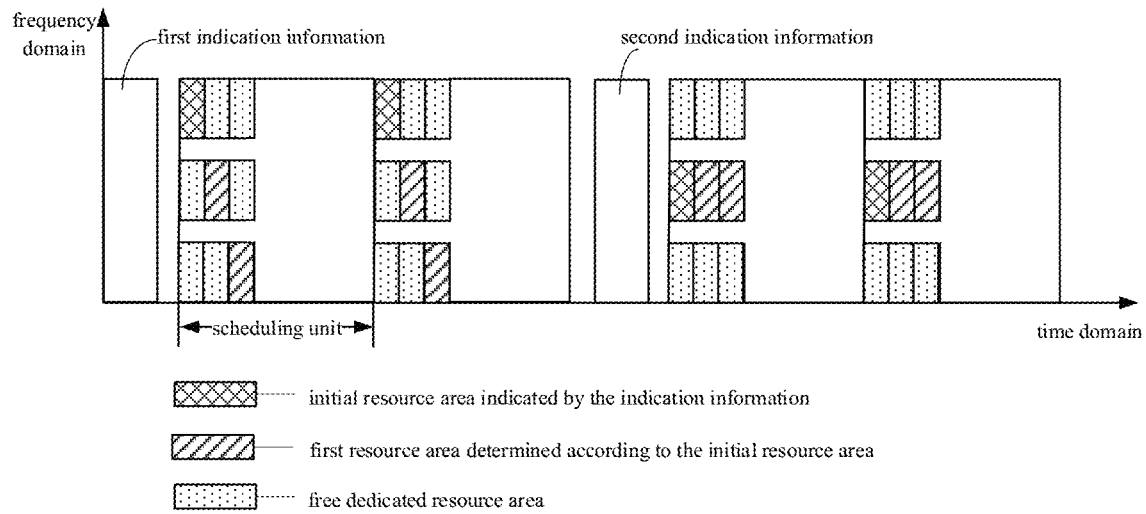
FIG. 5 is a schematic diagram of another example of a method for transmitting information according to an embodiment of the present disclosure.

FIG. 5 is another schematic diagram of a method for transmitting information according to an embodiment of the present disclosure. As shown in FIG. 5, the first indication information is used to indicate an initial resource area $P_{target1}$ of the first resource area, and the terminal device can determine the remaining two first resource areas according to the initial resource area of the first resource area. Specifically, the terminal device can determine the first transmission mode from the plurality of transmission modes according to the first indication information, and determine the remaining two first resource areas according to the first transmission mode.

It should be noted that different resource areas can include at least two situations: one is that there is no overlap between resource areas, that is, there is no duplicate time-frequency resources; another is that there is a partial overlap between resource areas, which is not limited in the embodiments of the present disclosure.

Optionally, after receiving the first indication information, and before receiving second indication information, the terminal device can receive the first downlink control information by detecting the first downlink control information on the first resource on each scheduling unit.

Specifically, the second indication information is used to indicate that the first resource area has changed or the second indication information is used to indicate a change result of the first resource area.

For example, the terminal device can determine the first resource area according to the first indication information. The "first resource area determined according to the first indication information" can be referred to as "first resource area A".

The terminal device can detect the first downlink control information on the first resource area A of each scheduling unit until the terminal device receives the second indication information. In other words, after receiving the first indication information (or determining the first resource area A), and before receiving the second indication information, the terminal device can detect the first downlink control information on the first resource area A of each scheduling unit.

As shown in FIG. 3 to FIG. 5, if the terminal device receives the second indication information, the terminal device can determine the first resource area according to the second indication information. The "first resource area determined according to the second indication information"

can be referred to as a "first resource area B". After receiving the second indication information, the terminal device can detect the first downlink control information on the first resource area B of each scheduling unit until the terminal device receives the next indication information. For the description of the second indication information, reference can be made to the description of the first indication information, which will not be repeated herein.

In (2b), the initial resource areas of each of the plurality of transmission modes are different. At this time, the terminal device can determine the first transmission mode according to the first indication information.

If the initial resource areas corresponding to at least two of the plurality of transmission modes are the same, the terminal device has to determine the first transmission mode through other manner.

For example, assuming that the plurality of transmission modes are K transmission modes, and the initial resource areas corresponding to L transmission modes are the same as the initial resource area of the first resource area indicated by the first indication information. The terminal device can detect the first downlink control information on the second resource area corresponding to the L transmission modes. Further, the terminal device can also determine the second resource area in the first resource area by detecting downlink control information on the second resource area corresponding to the L transmission modes. The terminal device can select, in the L transmission modes, J ($1 \leqslant J \leqslant L$) transmission modes having the second resource area the same as the second first resource area in the first resource area. If J=1, the transmission mode is determined to be the first transmission mode, and the first downlink control information is detected on the resource area corresponding to the first transmission mode. If J$\geqslant$2, the terminal device can continue to select the transmission mode until the first transmission mode is determined.

It should be noted that, in (I), the first indication information can be understood as resource information of the first resource area. The content indicated by the first indication information is related to the first resource area. The first resource area (specific time-frequency resource) used by the network device to transmit downlink control information can be indicated (or configured) through the indication information (for example, first indication information). The terminal device can determine all or part of the first resource area through the first indication information.

(II) The first indication information is used to indicate that the first resource area has changed.

Figure 6:
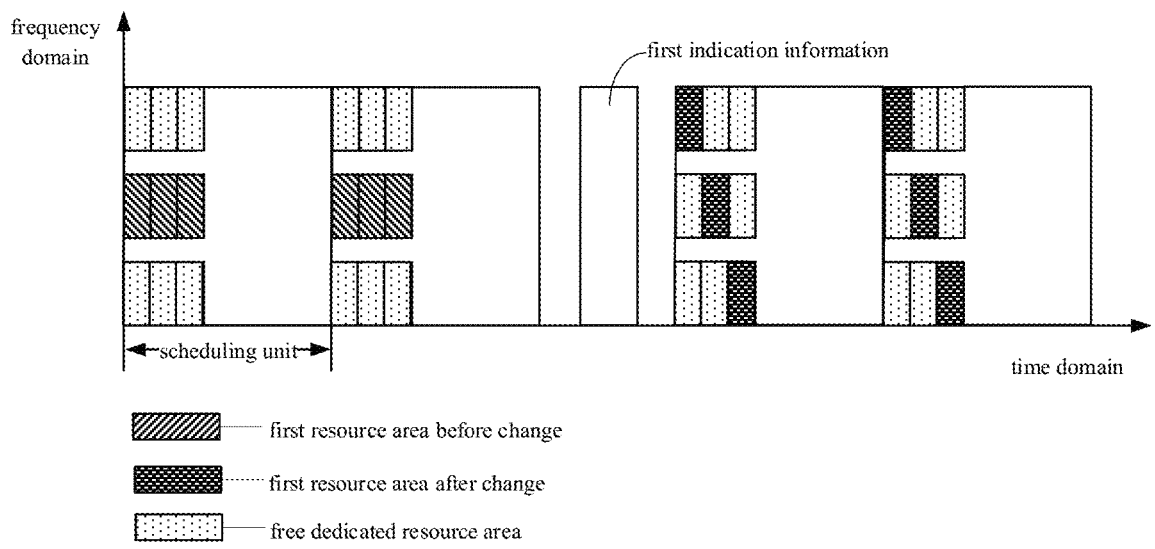
FIG. 6 is a schematic diagram of still another example of a method for transmitting information according to an embodiment of the present disclosure.

FIG. 6 is a schematic diagram of still another example for transmitting downlink control information according to an embodiment of the present disclosure. As shown in FIG. 6, after receiving the first indication information, the terminal device determines that the first resource area has changed, and it will be wrong if the terminal device still detects the first downlink control information on the previous first resource area. Therefore, the terminal device receives the first downlink control information by detecting the first downlink control information on all or part of the second resource area for transmitting downlink control information according to the first indication information.

The second resource area for transmitting the downlink control information can be agreed between the network device and the terminal device, can be previously configured, or can be configured through configuration information.

For example, the network device and the terminal device can previously configure a second resource area for transmitting downlink control information by using subscription information, factory information, and initialization information.

For another example, the network device can send second configuration information to the terminal device, wherein the second configuration information is used to configure a second resource area for transmitting downlink control information.

It should be noted that the first configuration information and the second configuration information in the embodiment of the present disclosure can be sent through two messages, or can be sent through one message, which is not limited herein.

Alternatively, configuration information (e.g., first configuration information and/or second configuration information) can be carried in system information or in dedicated signaling.

For convenience of explanation, "the second resource area for transmitting downlink control information" can be referred to as a "dedicated resource area". The dedicated resource area can be used to transmit downlink control information. In the process of actually transmitting downlink information, the network device can transmit downlink control information on all or part of a dedicated resource area. The dedicated resource area used can be the first resource area in the embodiment of the present disclosure.

Optionally, if the first indication information is used to indicate that the first resource area has changed, the terminal device receiving the first downlink control information by detecting the first downlink control information on all or part of the second resource area for transmitting downlink control information according to the first indication information may include the following two implementations.

First Implementation

The terminal device can detect the first downlink control information on the dedicated resource area.

Specifically, assuming that the dedicated resource area includes $P_1$-$P_9$, after receiving the first indication information, the terminal device receives the first downlink control information by detecting the first downlink control information on the $P_1$-$P_9$.

Further, the terminal device can determine the first resource area by detecting downlink control information on the dedicated resource area.

Second Implementation

Specifically, the terminal device can determine an initial resource area of the first resource area for transmitting downlink control information by detecting downlink control information on all or part of the dedicated resource area; and the terminal device determines the first transmission mode corresponding to the initial resource area of the first resource area from the plurality of transmission modes according to the initial resource area of the first resource area.

For the description of the second implementation, reference can be made to the related description above, and details are not described herein for brevity.

Optionally, in the method of the embodiment of the present disclosure, the first indication information is used to indicate a first resource area for transmitting downlink control information, and the first indication information is used to indicate at least one of an initial resource area of a first resource area for transmitting downlink control information, a location of the frequency domain resource included in the first resource area for transmitting downlink control information, a starting location of the frequency domain resource included in the first resource area for transmitting downlink control information, the granularity of the frequency domain resource included in the first resource area for transmitting downlink control information, the location of the time domain resource included in the first resource area for transmitting downlink control information, a starting location of the time domain resource included in the first resource area for transmitting downlink control information, the granularity of the time domain resource included in the first resource area for transmitting downlink control information, and a transmission mode corresponding to the downlink control information. The transmission mode corresponding to the downlink control information corresponds to the first resource area for transmitting downlink control information.

In the method of the embodiment of the present disclosure, the network device can flexibly determine the first resource area, and send the first indication information to the terminal device, so that the terminal device can receive the first downlink control information according to the first indication information. The method can improve the flexibility of transmitting downlink control information, can better adapt to satisfy the requirement of flexibly configuring the first resource for transmitting downlink control information in a large-bandwidth system, and can improve system efficiency and reduce system interference.

The method for transmitting information according to the embodiment of the present disclosure is described above with reference to FIG. 3 to FIG. 6. The terminal device and the network device according to the embodiments of the present disclosure are described below with reference to FIG. 7 to FIG. 10.

Figure 7:
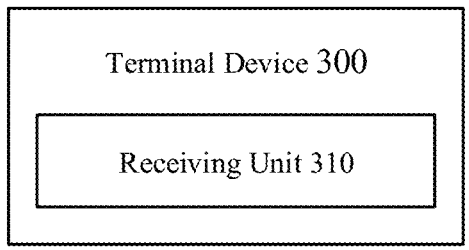
FIG. 7 is a schematic block diagram of an example of a terminal device according to an embodiment of the present disclosure.

FIG. 7 is a schematic block diagram of an example of a terminal device according to an embodiment of the present disclosure.

As shown in FIG. 7, the terminal device 300 includes: a receiving unit 310 configured to receive first indication information sent by a network device, and receive first downlink control information sent by the network device according to the first indication information.

Optionally, the terminal device 300 further includes: a processing unit configured to determine, according to the first indication information, a first resource area for transmitting downlink control information. The receiving unit 310 is specifically configured to receive first downlink control information by detecting the first downlink control information sent by the network device on the first resource area.

Optionally, the first indication information is used to indicate the first resource area.

Optionally, the processing unit is specifically configured to, determine, according to the first indication information, a first transmission mode from a plurality of transmission modes, wherein a resource area corresponding to each of the plurality of transmission modes is different; and determine the resource area corresponding to the first transmission mode as the first resource area.

Optionally, the first indication information is used to indicate the first transmission mode.

Optionally, a starting resource area corresponding to each of the transmission modes is different; and the first indication information is used to indicate a starting resource area in the first resource area. Then, the processing unit is specifically configured to according to the first indication information, determine, from the plurality of transmission modes, a first transmission mode corresponding to the starting resource area in the first resource area.

Optionally, the starting resource area corresponding to each of the transmission modes is different, and the first indication information is used to indicate that the first resource area for transmitting the downlink control information has changed. Then, the processing unit is specifically configured to, according to the first configuration information, determine the initial resource area in the first resource area by detecting downlink control information on all or part of the second resource area for transmitting downlink control information previously configured or configured in configuration information; and according to the initial resource area in the first resource area, determine a first transmission mode corresponding to the initial resource area from the plurality of transmission modes.

Optionally, the plurality of transmission modes are previously configured, or the plurality of transmission modes are configured through configuration information.

Optionally, the receiving unit 310 is specifically configured to, after the receiving unit 310 receives the first indication information, and before the receiving unit 310 receives the second indication information, receive the first downlink control information by detecting the first downlink control information on the first resource area of each scheduling unit of the at least one scheduling unit, wherein the second indication information is used to indicate that the first resource area has changed or the second indication information is used to indicate a change result of the first resource area.

Optionally, the first indication information is used to indicate that the first resource area for transmitting the downlink control information has changed. The receiving unit 310 is specifically configured to, according to the first indication information, receive the first downlink control information by detecting the downlink control information on all or part of the second resource area for transmitting downlink control information previously configured or configured in configuration information.

Optionally, the terminal device 300 further includes: a processing unit configured to determine a first resource area for transmitting downlink control information by detecting downlink control information on all or part of the second resource area.

Optionally, the processing unit is specifically configured to determine the first resource area by detecting the downlink control information on all or part of the second resource area, in an initial scheduling unit after receiving the first indication information.

Optionally, the receiving unit 310 is specifically configured to, after the processing unit determines the first resource area, and before the receiving unit 310 receives the second indication information, receive first downlink control information by detecting the first downlink control information on the first resource area of each scheduling unit of the at least one scheduling unit, wherein the second indication information is used to indicate that the first resource area has changed or the second indication information is used to indicate a change result of the first resource area.

Optionally, the frequency domain resource included in the resource area is part of the system bandwidth.

Optionally, the receiving unit 310 is further configured to receive first configuration information and/or second configuration information that is sent by the network device, wherein the first configuration information is used to configure a plurality of transmission modes for transmitting downlink control information, and the second configuration information is used to configure the second resource area for transmitting downlink control information.

Optionally, the first indication information is used to indicate at least one of a first resource area for transmitting downlink control information, a location of a frequency domain resource included in the first resource area for transmitting downlink control information, a starting location of the frequency domain resource included in the first resource area for transmitting the downlink control information, a granularity of the frequency domain resource included in the first resource area for transmitting the downlink control information, a location of the time domain resource included in the first resource area for transmitting downlink control information, a starting location of the time domain resource included in the first resource area for transmitting downlink control information, a granularity of the time domain resource included in the first resource area for transmitting downlink control information, and a transmission mode corresponding to the downlink control information. The transmission mode corresponding to the downlink control information corresponds to the first resource area for transmitting downlink control information.

Specifically, the terminal device 300 can correspond to a terminal device of a method for transmitting information according to an embodiment of the present disclosure, and the terminal device 300 can include a unit for performing a method performed by the terminal device in the above method. In addition, the physical units in the terminal device 300 and the other operations and/or functions described above are respectively used for the corresponding steps of the above method, which will not be repeated herein for brevity.

Figure 8:
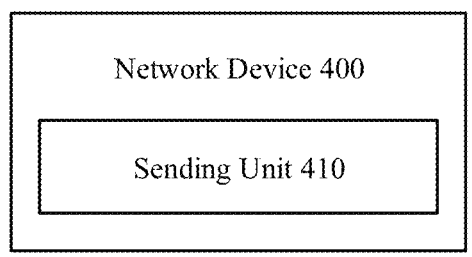
FIG. 8 is a schematic block diagram of an example of a network device according to an embodiment of the present disclosure.

FIG. 8 is a schematic block diagram of an example of a network device 400 according to an embodiment of the present disclosure. As shown in FIG. 8, the network device 400 includes: a sending unit 410. The sending unit 410 is configured to send first indication information according to a first resource area for transmitting downlink control information, wherein the first indication information is used for the terminal device to receive first downlink control information sent by the sending unit 410; and send downlink control information on the first resource area for transmitting downlink control information.

Optionally, the sending unit 410 is specifically configured to, when the processing unit included in the network device determines according to the first resource area for transmitting downlink control information, that the first resource area has changed, send the first indication information, wherein the first resource area for transmitting downlink control information is the resulted first resource area after the change.

Optionally, the first indication information is used to indicate that the first resource area has changed; and/or the first indication information is used to indicate a change result of the first resource area.

Optionally, the first indication information is used by the terminal device to determine a first resource area for transmitting downlink control information, so that the terminal device receives the first downlink control information by detecting the first downlink control information on the first resource area for transmitting downlink control information.

Optionally, the first indication information is used to indicate the first resource area used for transmitting downlink control information.

Optionally, the first indication information is used to indicate a first transmission mode, so that the terminal device determines, according to the first indication information, the resource area corresponding to the first transmission mode determined from the plurality of transmission modes is the first resource area for transmitting downlink control information, wherein a resource area corresponding to each of the plurality of transmission modes is different.

Optionally, the first indication information is used to indicate an initial resource area for transmitting downlink control information, so that the terminal device determines, according to the first indication information, the resource area corresponding to the transmission mode determined from the plurality of transmission modes is the first resource area for transmitting downlink control information, wherein an initial resource area corresponding to each of the plurality of transmission modes is different.

Optionally, the sending module is further configured to, send first configuration information and/or second configuration information, wherein the first configuration information is used to configure a plurality of transmission modes for transmitting downlink control information, and the second configuration information is used to configure a second resource area for transmitting downlink control information.

Optionally, the first indication information is used to indicate a first resource area for transmitting downlink control information, and the first indication information is used to indicate at least one of an initial resource area of a first resource area for transmitting downlink control information, a location of the frequency domain resource included in the first resource area for transmitting downlink control information, a starting location of the frequency domain resource included in the first resource area for transmitting downlink control information, the granularity of the frequency domain resource included in the first resource area for transmitting downlink control information, the location of the time domain resource included in the first resource area for transmitting downlink control information, a starting location of the time domain resource included in the first resource area for transmitting downlink control information, the granularity of the time domain resource included in the first resource area for transmitting downlink control information, and a transmission mode corresponding to the downlink control information. The transmission mode corresponding to the downlink control information corresponds to the first resource area for transmitting downlink control information.

Specifically, the network device 400 can correspond to a network device of a method for transmitting information according to an embodiment of the present disclosure, and the network device 400 can include a physical unit for performing a method performed by the network device in the above method. In addition, the physical units in the network device 400 and the other operations and/or functions described above are respectively used for the corresponding steps of the above method, which will not be repeated herein for brevity.

Figure 9:
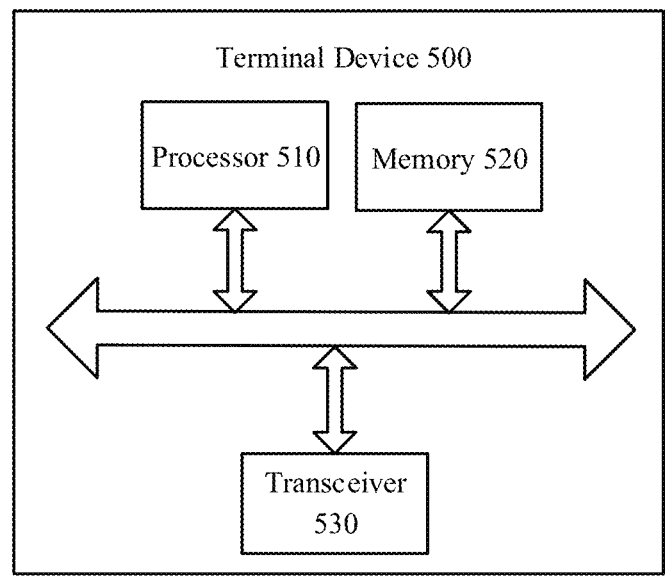
FIG. 9 is a schematic block diagram of another example of a terminal device according to an embodiment of the present disclosure.

FIG. 9 is a schematic block diagram of another example of a terminal device according to an embodiment of the present disclosure. The terminal device 500 shown in FIG. 9 can include:

a processor 510, a memory 520, and a transceiver 530. The processor 510, the memory 520 and the transceiver 530 are connected in communication. The memory 520 is configured to store instructions, and the processor 510 is configured to execute the instructions stored in the memory 520 to control the transceiver 530 to send and receive signals. The memory 520 can be configured in the processor 510 or can be separated from the processor 510.

The processor 510 is configured to control the transceiver 630 to receive first indication information sent by the network device, and receive first downlink control information sent by the network device according to the first indication information.

Specifically, the terminal device 500 can correspond to a terminal device of a method for transmitting information according to an embodiment of the present disclosure, and the terminal device 500 can include a physical unit for performing a method performed by the terminal device in the above method. In addition, the physical units in the terminal device 500 and the other operations and/or functions described above are respectively used for the corresponding steps of the above method, which will not be repeated herein for brevity.

Figure 10:
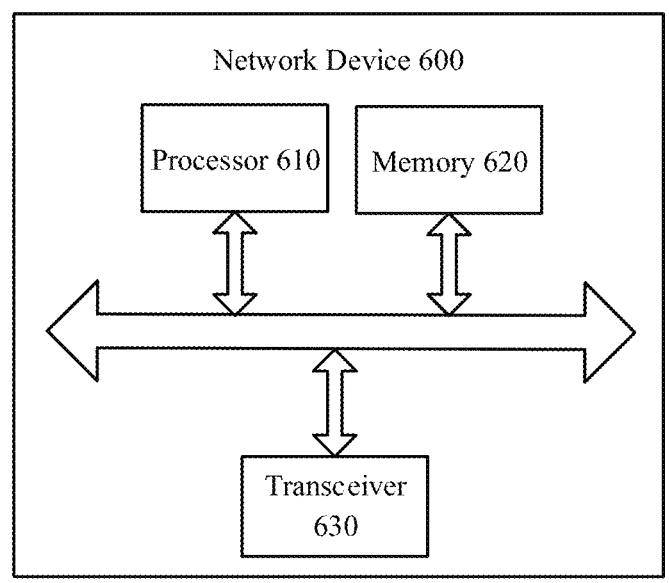
FIG. 10 is a schematic block diagram of another example of a network device according to an embodiment of the present disclosure.

FIG. 10 is a schematic block diagram of another example of a network device according to an embodiment of the present disclosure. The network device 600 shown in FIG. 10 includes:

a processor 610, a memory 620, and a transceiver 630. The processor 610, the memory 620 and the transceiver 630 are connected in communication. The memory 620 is configured to store instructions, and the processor 610 is configured to execute the instructions stored in the memory 620 to control the transceiver 630 to send and receive signals. The memory 620 can be configured in the processor 610 or can be separated from the processor 610.

The processor 610 is configured to control the transceiver 630 to send first indication information according to a first resource area for transmitting the downlink control information, wherein the first indication information is used by the terminal device to receive first downlink control information sent by the network device; and send downlink control information on the first resource area for transmitting the downlink control information.

Specifically, the network device 600 can correspond to a network device of a method for transmitting information according to an embodiment of the present disclosure, and the network device 600 can include a physical unit for performing a method performed by the network device in the above method. In addition, the physical units in the network device 600 and the other operations and/or functions described above are respectively used for the corresponding steps of the above method, which will not be repeated herein for brevity.

It should be understood that the processor in the embodiment of the present disclosure can be an integrated circuit chip with signal processing capability. In the implementation process, each step of the foregoing method embodiment can be completed by an integrated logic circuit of hardware in a processor or an instruction in a form of software. The processor can be a central processing unit (CPU), the processor can be another general-purpose processor, a digital signal processor (DSP), or an application specific integrated circuit (ASIC), Field Programmable Gate Array (FPGA) or other programmable logic devices, discrete gate or transistor logic devices, discrete hardware components. The methods, steps, and logical block diagrams disclosed in the embodiments of the present disclosure can be implemented or carried out. The general purpose processor can be a microprocessor or the processor can be any conventional processor or the like. The steps of the method disclosed in the embodiments of the present disclosure can be directly implemented by the hardware decoding processor, or can be performed by a combination of hardware and software in the decoding processor. The software can be located in a random storage medium, a flash memory, a read only memory, a programmable read only memory or an electrically erasable programmable memory, a register, and other storage medium well known in the art. The storage medium is disposed in the memory, and the processor reads the information in the memory and performs the steps of the above method in cooperation with the hardware.

It should also be understood that the memory in embodiments of the present disclosure can be a volatile memory or a non-volatile memory, or can include both volatile and nonvolatile memory. The non-volatile memory can be a read-only memory (ROM), a programmable read only memory (PROM), an erasable programmable read only memory (Erasable PROM, EPROM), or an electrically erasable programmable read only memory (EEPROM) or a flash memory. The volatile memory can be a random access memory (RAM) that acts as an external cache. By way of example and not limitation, many forms of RAM are available, such as static random access memory (Static RAM, SRAM), dynamic random access memory (DRAM), synchronous dynamic random access memory (SDRAM), double data rate synchronous dynamic random access memory (Double Data Rate SDRAM, DDR SDRAM), enhancement Type Synchronous Dynamic Random Access Memory (ESDRAM), Synchronous Connection Dynamic Random Access Memory (SDRAM) and Direct Memory Bus Random Memory (DR RAM). It should be noted that the memories of the systems and methods described herein are intended to include, without being limited to, these and any other suitable types of memory.

It should also be understood that in the embodiment of the present disclosure, "B corresponding to A" means that B is associated with A, and B can be determined according to A. However, it should also be understood that determining B according to A does not mean that B is determined only according to A, and that B can also be determined according to A and/or other information. It should be understood that the term "and/or" herein is merely an association relationship describing an associated object, indicating that there can be three relationships. For example, A and/or B can indicate three situations: only A, both A and B, and only B. In addition, the symbol "/" herein generally indicates that the contextual object is an "or" relationship.

In the implementation process, each step of the above method can be completed by an integrated logic circuit of hardware in a processor or instructions in a form of software. The steps of the method disclosed in the embodiment of the present disclosure can be directly implemented as to be performed by a hardware processor, or can be performed by a combination of hardware and software in a processor. The software can be stored in a random storage medium, a flash memory, a read only memory, a programmable read only memory or an electrically erasable programmable memory, a register, and other medium well known in the art. The storage medium is disposed in the memory, and the processor reads the information in the memory and performs the steps of the above method in cooperation with the hardware. To avoid repetition, it will not be described in detail here.

An embodiment of the present disclosure also provide a computer readable storage medium storing one or more programs, the one or more programs including instructions that, when executed by a portable electronic device including a plurality of applications, enable the portable electronic device to perform the method of the embodiments illustrated in FIGS. 3-6.

In a first aspect, a method for transmitting information is provided, including: receiving, by a terminal device, first indication information sent by a network device; and receiving, by the terminal device, first downlink control information sent by the network device, according to the first indication information.

In this implementation, the terminal device receives the first downlink control information according to the first indication information, so that the first resource area for transmitting the downlink control information can dynamically change. The solution can better adapt to the requirement of flexibly configuring the first resource for transmitting downlink control information in the large-bandwidth system, improving system efficiency and reducing system interference.

In a possible implementation of the first aspect, receiving, by the terminal device, first downlink control information sent by the network device, according to the first indication information includes: determining, by the terminal device, a first resource area for transmitting downlink control information according to the first indication information; and receiving, by the terminal device, first downlink control information by detecting the first downlink control information sent by the network device on the first resource area.

In this implementation, the terminal device may determine, according to the first indication information, the first resource area for transmitting the downlink control information, so that the terminal device can know which resource areas to detect the first downlink control information. It can avoid the terminal device blindly detecting the first downlink control information, and it can improve the efficiency of acquiring the first downlink control information by the terminal device.

In a possible implementation of the first aspect, the first indication information is used to indicate the first resource area.

In this implementation, the first indication information directly indicates the first resource area, so that the terminal device can quickly determine the first resource area according to the first indication information, and the solution can shorten the duration of determining the first resource area by the terminal device.

In a possible implementation of the first aspect, determining, by the terminal device, a first resource area for transmitting downlink control information according to the first indication information includes: determining, by the terminal device, a first transmission mode from a plurality of transmission modes according to the first indication information, wherein a resource area corresponding to each of the plurality of transmission modes is different; and determining, by the terminal device, the resource area corresponding to the first transmission mode as the first resource area.

In this implementation, the terminal device can determine the first transmission mode according to the first indication information, and further determine that the resource area corresponding to the first transmission mode is the first resource area. The solution is highly flexible, with good compatibility and applicability.

In a possible implementation of the first aspect, the first indication information is used to indicate the first transmission mode.

In this implementation, the first indication information directly indicates the first transmission mode, so that the terminal device can quickly determine the first transmission mode according to the first indication information, and further determines the first resource area according to the first transmission mode. The solution can shorten the duration of determining the first resource area by the terminal device. Further, the first indication information indicates that the first transmission mode can reduce the complexity indicated by the first indication information, which is beneficial to improving system performance, compared to the first indication information indicating the first resource area.

In a possible implementation of the first aspect, starting resource areas corresponding to respective transmission modes are different; the first indication information is used to indicate a starting resource area in the first resource area; and determining, by the terminal device, a first transmission mode from a plurality of transmission modes according to the first indication information includes: determining, by the terminal device, a first transmission mode from a plurality of transmission modes, which corresponds to the starting resource area in the first resource area, according to the first indication information.

In this implementation, the first indication information can indicate an initial resource area of the first resource area, so that the terminal device can determine the first transmission mode according to the initial resource area of the first resource area, and further determine the first resource area according to the first transmission mode. The first indication information indicating the initial resource area in the first resource area can reduce the complexity of the indication of the first indication information, which is beneficial to improve system performance.

In a possible implementation of the first aspect, starting resource areas corresponding to respective transmission modes are different, and the first indication information is used to indicate that the first resource area for transmitting downlink control information has changed; and determining, by the terminal device, a first transmission mode from a plurality of transmission modes according to the first indication information includes: determining, by the terminal device, an initial resource area in the first resource area by detecting downlink control information on all or part of a second resource area for transmitting downlink control information configured previously or in configuration information; and determining, by the terminal device, a first transmission mode corresponding to the initial resource area from the plurality of transmission modes according to the initial resource area in the first resource area.

In this implementation, the first indication information can take only one bit for indicating that the first resource area has changed, which can save system resources. Further, the terminal device can first determine an initial resource area of the first resource area, and determine a first transmission mode according to the initial resource area of the first resource area. The solution is flexible, and is beneficial for the terminal device to quickly determine the first resource area.

In a possible implementation of the first aspect, the plurality of transmission modes are previously configured, or the plurality of transmission modes are configured through configuration information.

The multiple modes can be previously configured, or configured through configuration information, so the flexibility of the solution is high.

In a possible implementation of the first aspect, receiving, by the terminal device, first downlink control information by detecting the first downlink control information sent by the network device on the resource area includes: after the terminal device receives the first indication information, and before the terminal device receives second indication information, receiving, by the terminal device, the first downlink control information by detecting the first downlink control information on the first resource area in each scheduling unit of at least one scheduling unit; wherein the second indication information is used to indicate that the first resource area has changed or the second indication information is used to indicate a change result of the first resource area.

After the terminal device determines the first resource area, the terminal device can receive the first downlink control information by detecting the first downlink control information on each scheduling unit of the at least one scheduling unit. The terminal device does not need to frequently determine the first resource area repeatedly, which can improve system performance.

In a possible implementation of the first aspect, the first indication information is used to indicate that a first resource area for transmitting downlink control information has changed; and receiving, by the terminal device, first downlink control information sent by the network device, according to the first indication information, includes: receiving, by the terminal device, the first downlink control information by detecting the first downlink control information on all or part of second resource area for transmitting downlink control information configured previously or in configuration information, according to the first indication information.

In this implementation, the first indication information can take only one bit for indicating that the first resource area has changed, which can save system resources. Further, the second resource area can be understood as a search space. Previously configuring the search space can improve the efficiency for the terminal device detecting the first downlink control information, and can avoid blind detection of the terminal device.

In a possible implementation of the first aspect, the method further includes: determining, by the terminal device, a first resource area for transmitting downlink control information by detecting downlink control information on all or part of the second resource area.

In a possible implementation of the first aspect, determining, by the terminal device, a first resource area for transmitting downlink control information by detecting downlink control information on all or part of the second resource area includes: determining, by the terminal device, the first resource area by detecting downlink control information on all or part of the second resource area in an initial scheduling unit after the terminal device receives the first indication information.

In this implementation, the terminal device can determine the first resource area in time, and can perform detection according to the first resource area, thereby improving the efficiency of the terminal device detecting the first downlink control information.

In a possible implementation of the first aspect, receiving, by the terminal device, the first downlink control information by detecting the first downlink control information on all or part of second resource area for transmitting downlink control information configured previously or in configuration information, according to the first indication information, includes: after the terminal device determines the first resource area, and before the terminal device receives the second indication information, receiving, by the terminal device, the first downlink control information by detecting the first downlink control information on the first resource area in each scheduling unit of at least one scheduling unit; wherein the second indication information is used to indicate that the first resource area has changed or the second indication information is used to indicate a change result of the first resource area.

In this implementation, after the terminal device determines the first resource area, the terminal device can detect first downlink control information on the first resource area of each scheduling unit of the at least one scheduling unit, and it can improve the efficiency for the terminal device to detect the first downlink control information.

In a possible implementation of the first aspect, a frequency domain resource included in the resource area is part of a system bandwidth.

In this implementation, the frequency domain resources included in the resource area are part of the system bandwidth. The network device does not need to take the entire bandwidth to send downlink control information, which can save system resources and avoid unnecessary interference between network devices.

In a possible implementation of the first aspect, the method further includes: receiving, by the terminal device, first configuration information and/or second configuration information sent by the network device; wherein the first configuration information is used to configure a plurality of transmission modes for transmitting downlink control information, and the second configuration information is used to configure a second resource area for transmitting downlink control information.

In this implementation, the second resource area and/or the plurality of transmission modes for transmitting downlink control information are configured through configuration information, which is highly flexible.

Optionally, in a possible implementation of the first aspect, the method further includes that the first indication information is used to indicate an initial resource area of the first resource area, and if the terminal device determines that the initial resource area of the first resource area is not used for transmission of downlink control information by detecting the initial resource area of the first resource area, the terminal device can determine that the scheduling unit does not perform downlink control information transmission.

In a second aspect, there is provided a method for transmitting information, including: sending, by a network device, first indication information according to a first resource area for transmitting downlink control information, wherein the first indication information is used by a terminal device to receive first downlink control information sent by the network device; and sending, by a network device, downlink control information on the first resource area for transmitting downlink control information.

In a possible implementation of the second aspect, sending, by a network device, first indication information to the terminal device according to a first resource area for transmitting downlink control information includes: when the network device determines that the first resource area has changed according to the first resource area for transmitting downlink control information, sending, by the network device, first indication information, wherein the first resource area for transmitting downlink control information is the resulted first resource area after the change.

In a possible implementation of the second aspect, the first indication information is used to indicate that the first resource area has changed; and/or the first indication information is used to indicate a change result of the first resource area.

In a possible implementation of the second aspect, the first indication information is used by the terminal device to determine the first resource area for transmitting downlink control information, so that the terminal device receives the first downlink control information by detecting the first downlink control information on the first resource area for transmitting downlink control information.

In a possible implementation of the second aspect, the first indication information is used to indicate the first resource area for transmitting downlink control information.

In a possible implementation of the second aspect, the first indication information is used to indicate a first transmission mode, so that the terminal device determines, according to the first indication information, a resource area corresponding to a first transmission mode determined from a plurality of transmission modes as the first resource area for transmitting downlink control information, wherein a resource area corresponding to each of the plurality of transmission modes is different.

In a possible implementation of the second aspect, the first indication information is used to indicate an initial resource area for transmitting downlink control information, so that the terminal device determines, according to the first indication information, a resource area corresponding to a first transmission mode determined from a plurality of transmission modes as the first resource area for transmitting downlink control information, wherein an initial resource area corresponding to each of the plurality of transmission modes is different.

In a possible implementation of the second aspect, the first indication information is used to indicate that the first resource area has changed.

In a possible implementation of the second aspect, the method further includes: sending, by the network device, first configuration information and/or second configuration information; wherein the first configuration information is used to configure a plurality of transmission modes for transmitting downlink control information, and the second configuration information is used to configure a second resource area for transmitting downlink control information.

Optionally, in or a possible implementation of the first aspect or the second aspect, the first configuration information and/or the second configuration information may be carried in system information, or in dedicated control signaling (or channel).

Optionally, in or a possible implementation of the first aspect or the second aspect, the first indication information may be carried in the radio resource control RRC layer signaling, the medium access control MAC layer signaling, or the physical layer signaling.

In a possible implementation of the second aspect, the first indication information is used to indicate at least one of a first resource area for transmitting downlink control information, a location of a frequency domain resource included in the first resource area for transmitting downlink control information, a starting location of the frequency domain resource included in the first resource area for transmitting downlink control information, a granularity of the frequency domain resource included in the first resource area for transmitting downlink control information, a location of a time domain resource included in the first resource area for transmitting downlink control information, a starting location of the time domain resource included in the first resource area for transmitting downlink control information, a granularity of the time domain resource included in the first resource area for transmitting downlink control information, and a transmission mode corresponding to the downlink control information, wherein the transmission mode corresponding to the downlink control information corresponds to the first resource area for transmitting downlink control information.

In this implementation, the first indication information can be used to indicate various types of information, and the flexibility of the solution is high, which is beneficial for the terminal device to determine the first downlink control information according to the first indication information.

Those of ordinary skill in the art will appreciate that the units and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to go beyond the scope of the embodiments of the present disclosure.

A person skilled in the art can clearly understand that for the convenience and brevity of the description, the specific working process of the system, the device and the unit described above can refer to the corresponding process in the foregoing method embodiment, details of which will not be repeated herein.

In the several embodiments provided by the present application, it should be understood that the disclosed systems, devices, and methods can be implemented in other manners. For example, the device embodiments described above are merely illustrative. For example, the division of the unit is only a logical function division. In actual implementation, there can be another division manner, for example, multiple units or components can be combined or integrated into another system, or some features can be ignored or skipped. In addition, the mutual coupling or direct coupling or communication connection shown or discussed can be an indirect coupling or communication connection through some interfaces, devices or units, and can be in an electrical, mechanical or other form.

The units described as separate components can or cannot be physically separated, and the components displayed as units can or cannot be physical units, that is, can be located in one place, or can be distributed to multiple network units. Some or all of the units can be selected according to actual needs to achieve the objective of the solution of the embodiment.

In addition, each functional unit in each embodiment of the embodiments of the present disclosure can be integrated into one processing unit, or each unit can exist physically separately, or two or more units can be integrated into one unit.

The functions can be stored in a computer readable storage medium if implemented in the form of a software functional unit and sold or used as a standalone product. Based on such understanding, the technical solution of the embodiments of the present disclosure in essence, or with the part contributing to the prior art or a part of the technical solution, can be embodied in the form of a software product stored in a storage medium. The storage medium includes instructions for causing a computer device (which can be a personal computer, a server, or a network device, etc.) to perform all or part of the steps of the methods described in various embodiments of the present disclosure. The foregoing storage medium includes: a U disk, a mobile hard disk, a read-only memory (ROM), a random access memory (RAM), a magnetic disk, or an optical disk, and the like.

The foregoing is only specific embodiments of the embodiments of the present disclosure, but the scope of protection of the embodiments of the present disclosure is not limited thereto. Any person skilled in the art can easily contemplate modifications or substitutions within the technical scope disclosed in the embodiments of the present disclosure, all of which should be covered in the protection scope of the embodiments of the present disclosure. Therefore, the protection scope of the embodiments of the present disclosure should be determined by the scope of the claims.

What is claimed is:

1. A method for transmitting information, comprising:
   sending, by a network device, first configuration information, wherein the first configuration information is used to configure a plurality of transmission modes for transmitting downlink control information, wherein at least one of a resource area or an initial resource area corresponding to each of the plurality of transmission modes is different;
   sending, by the network device, first indication information, wherein the first indication information is used to indicate the resource area or the initial resource area, and comprises information that enables a terminal device to select, according to the first indication information, a first transmission mode, from the plurality of transmission modes and determines a resource area corresponding to the first transmission mode as a first resource area for transmitting first downlink control information; and
   sending, by the network device, the first downlink control information on the first resource area.

2. The method according to claim 1, wherein the first indication information is corresponded to one terminal device, or the first indication information is corresponded to a plurality of terminal devices.

3. The method according to claim 1, wherein the first indication information is used to indicate that the first resource area for transmitting downlink control information has changed.

4. The method according to claim 3, wherein the first indication information comprises information that enables the terminal device to determine the first resource area for transmitting downlink control information by detecting downlink control information on all or part of a second resource area.

5. The method according to claim 4, wherein the first indication information comprises information that enables the terminal device to determine the first resource area by detecting downlink control information on all or part of the second resource area in an initial scheduling unit after the first indication information is received.

6. A method for transmitting information, comprising:
   receiving, by a terminal device, first configuration information, wherein the first configuration information is used to configure a plurality of transmission modes for transmitting downlink control information, wherein at least one of a resource area or an initial resource area corresponding to each of the plurality of transmission modes is different;
   receiving, by the terminal device, first indication information, wherein the first indication information is used to indicate the resource area or the initial resource area, and selecting, by the terminal device, a first transmission mode from the plurality of transmission modes according to the first indication information; and determining, by the terminal device, a resource area corresponding to the first transmission mode as a first resource area for transmitting first downlink control information; and
   receiving, by the terminal device, the first downlink control information on the first resource area.

7. The method according to claim 6, wherein the first indication information is corresponded to one terminal device, or the first indication information is corresponded to a plurality of terminal devices.

8. The method according to claim 6, wherein the first indication information is used to indicate that the first resource area for transmitting downlink control information has changed.

9. The method according to claim 8, further comprising:
   determining, by the terminal device, the first resource area for transmitting downlink control information by detecting downlink control information on all or part of a second resource area.

10. The method according to claim 9, wherein determining, by the terminal device, the first resource area for transmitting downlink control information by detecting downlink control information on all or part of the second resource area comprises: determining, by the terminal device, the first resource area by detecting downlink control information on all or part of the second resource area in an initial scheduling unit after the first indication information is received.

11. A network device, comprising a processor, a memory and a transceiver connected in communication, wherein memory is configured to store instructions, and the processor is configured to execute the instructions stored in the memory to control the transceiver to:
   send first configuration information, wherein the first configuration information is used to configure a plurality of transmission modes for transmitting downlink control information, wherein at least one of a resource area or an initial resource area corresponding to each of the plurality of transmission modes is different;
   send first indication information, wherein the first indication information is used to indicate the resource area or the initial resource area, and comprises information that enables a terminal device to select, according to the first indication information, a first transmission mode, from the plurality of transmission modes and determines a resource area corresponding to the first transmission mode as a first resource area for transmitting first downlink control information; and
   send the first downlink control information on the first resource area.

12. The network device according to claim 11, wherein the first indication information is corresponded to one terminal device, or the first indication information is corresponded to a plurality of terminal devices.

13. The network device according to claim 11, wherein the first indication information is used to indicate that the first resource area for transmitting downlink control information has changed.

14. The network device according to claim 13, wherein the first indication information comprises information that enables the terminal device to determine the first resource area for transmitting downlink control information by detecting downlink control information on all or part of a second resource area.

15. The network device according to claim 14, wherein the first indication information comprises information that enables the terminal device to determine the first resource area by detecting downlink control information on all or part of the second resource area in an initial scheduling unit after the first indication information is received.

16. The network device according to claim 14, wherein the processor is configured to:
   determine the first resource area by detecting downlink control information on all or part of the second resource area in an initial scheduling unit after the first indication information is received.

17. The network device according to claim 13, wherein the processor is configured to:
determine the first resource area for transmitting downlink control information by detecting downlink control information on all or part of a second resource area.

18. A terminal device, comprising a processor, a memory and a transceiver connected in communication, wherein memory is configured to store instructions, and the processor is configured to execute the instructions stored in the memory to control the transceiver to:
receive first configuration information, wherein the first configuration information is used to configure a plurality of transmission modes for transmitting downlink control information, wherein at least one of a resource area or an initial resource area corresponding to each of the plurality of transmission modes is different;
receive first indication information, wherein, wherein the first indication information is used to indicate the resource area or the initial resource area, and selecting, by the processor, a first transmission mode from the plurality of transmission modes according to the first indication information; and determining, by the processor, a resource area corresponding to the first transmission mode as a first resource area for transmitting first downlink control information; and
receive the first downlink control information on the first resource area.

19. The terminal device according to claim 18, wherein the first indication information is corresponded to one terminal device, or the first indication information is corresponded to a plurality of terminal devices.

20. The network device according to claim 18, wherein the first indication information is used to indicate that the first resource area for transmitting downlink control information has changed.

* * * * *